Patented Apr. 14, 1942

2,279,387

UNITED STATES PATENT OFFICE 2,279,387

RESIN EMULSION WITH CONSTANT VISCOSITY

Harold C. Cheetham, Philadelphia, and Robert J. Myers, Elkins Park, Pa., assignors to The Resinous Products & Chemical Company, Philadelphia, Pa.

No Drawing. Application March 8, 1939, Serial No. 260,524

7 Claims. (Cl. 260—6)

This invention relates to the improvement of water-base coating compositions containing drying oil-modified alkyd resins emulsified with casein. It particularly relates to a process of stabilizing the viscosity of such alkyd resin emulsions and to the resulting stabilized product.

Water-base paints containing emulsified alkyd-type resins yield films in which the binding agent for pigments is the resin. These films show good resistance to washing and cleaning in contrast to deposits from water-base paints in which glue, casein, gelatin or the like are used as the film-forming and pigment-binding ingredient. Many types of emulsifying agents for the dispersion of alkyd resins in water have been tried, but very few yield emulsions which possess the requisite properties for use in coatings. For example, many emulsions cannot be satisfactorily pigmented. Again, some emulsions which allow the addition of pigments yield coating compositions which cannot be brushed onto surfaces without premature breaking of the emulsion, resulting in clogging of the brush, rolling under the brush, etc. The emulsifying agent that we have found best has been casein, but it has not been entirely satisfactory, primarily because of changes in viscosity that take place when the emulsions or emulsion paints are stored.

As is well known, casein, particularly when in aqueous solution, gradually changes in chemical composition. This change results in a lowering of the viscosity of the solution. In emulsion paints utilizing casein as emulsifying agent, the casein is present primarily in the water phase and, as its chemical composition changes, the viscosity of the continuous phase and of the paint is lowered. As the brushing qualities of the paint depend to a large extent upon its viscosity, the paint, although originally prepared with the proper brushing viscosity, may become too fluid for good brushing after a few months' storage.

The object of this invention is to provide a drying oil-modified alkyd resin emulsion of stable viscosity suitable for use in the preparation of paints. A further object is to provide a satisfactory drying oil-modified alkyd emulsion paint having a stable viscosity. A still further object is to provide a way of overcoming the aforementioned difficulties encountered when casein is used as the emulsifying agent in such emulsions and paints and to provide a way of obtaining a casein-drying oil alkyd emulsion having a predeterminable stable viscosity.

We have found that the numerous advantages derived from using casein as emulsifying agent in the drying oil-alkyd emulsions may be retained, and the difficulties encountered through changes in viscosity may be overcome by treating the emulsions to reduce the viscosity imparted by the casein to a constant viscosity and to make up for the loss in viscosity by the addition of a chemically stable thickening agent. In order to obtain drying oil-alkyd casein emulsions of high quality, it is necessary to use a casein which produces a highly viscous solution. After the emulsion has been prepared, however, we have found that its quality and suitability for the preparation of paints is not impaired by treatments which reduce the viscosity of the aqueous phase. It is probable that during the treating period the casein is degraded through partial hydrolysis of the protein.

In practicing the invention an air-drying alkyd-type resin may be used that is made from a polyhydric alcohol, a polybasic acid and acids derived from drying oils such as tung, perilla, oiticica or linseed with or without other oils such as castor oil and soya bean oil. Suitable resins, such as rosin-maleic acid-glycerine condensates, and waxes, such as montan wax, may be added and also driers. A molten mixture of this resinous material is poured with vigorous stirring into an aqueous mixture containing casein solubilized with alkaline reagents to yield an emulsion. A small quantity of a bactericide, such as a phenol, may be incorporated. The emulsion is then maintained preferably at a raised temperature but below 100° C. until the viscosity of the emulsion decreases to a low value. Addition of a thickening agent may be made at this point. Water may also be added to adjust the solids content to a desired concentration.

If desired, the thickening agent may be incorporated with the peptized casein or it may be added to the emulsion during or after the treating period. This agent is preferably, but not necessarily, added in the form of a concentrated solution to ensure thorough and uniform distribution throughout the emulsion. The quantity of agent required depends upon the viscosity of the treated emulsion and the required viscosity of the stabilized emulsion. A few experiments will demonstrate the amount of any particular agent needed for a given formula.

As the final viscosity of the stabilized emulsion must be such that coating compositions prepared with these emulsions exhibit the requisite properties, the quantity of thickening agent added must be such that this viscosity is reached. This is the deciding factor in determining the quantity of stabilizing agent required. A fixed weight may not be satisfactory because different lots of these agents may vary slightly in their effectiveness. In general, the amount of viscosity stabilizer should be kept as low as possible and should not exceed 3% of the emulsion base, the exact amount depending on the particular stabilizer used, and the formulation. The required viscosity of the stabilized emulsion will vary with its concentration. When the solids content of an emulsion is about 50% by weight, an emulsion possessing a viscosity within the range from 30 to 100 seconds at 25° C. by the Gardner mobilometer using the 4-hole disc without added weights may be easily pigmented and reduced with water to brushing or spraying consistency. Higher or lower viscosities may be used but not as satisfactorily. Emulsions of higher solids content may have a viscosity above this range, but with more dilute emulsions it is still advisable to maintain the viscosity above the lower limit. In general, if an emulsion of the type described, diluted to 50% solids content if necessary, has a stable viscosity within the range given, it will be satisfactory for the preparation of emulsion paints.

When the viscosities of the emulsion paint base are stabilized within these limits, it is possible to follow fixed formulations and to produce uniform products. Definite recommendations can be made for application of emulsion bases or paints prepared therefrom and for reduction with water to the optimum viscosity for different conditions. Experience has shown that, for spraying or brushing on rough, well sealed surfaces, reduction should be made to yield a paint of about 22 seconds viscosity by the Ford cup method, while for smooth sealed surfaces a viscosity of about 15 seconds works well without sagging. New plaster surfaces require a reduced paint of about 12 to 13 seconds viscosity.

The agents which are suitable for stabilizing the viscosity of the alkyd resin-casein emulsions include the water-soluble salts of the alginates and water-soluble cellulose ethers, such as methyl cellulose, ethyl cellulose, and hydroxyethyl cellulose. Useful alginates include sodium alginate, ammonium alginate and magnesium alginate. These agents are such that the viscosity of the emulsion is maintained at a fixed value without interfering with the application of the emulsion as a coating. They do not replace the casein in the emulsion and, if used without the casein, do not yield emulsions which can be pigmented. The agents above-mentioned, when used in proper amounts, do not decrease the water-resistance of the paint films formed from the water-base paints containing them. Some thickening agents, such as the usual gums and starches, make the paint films sensitive to water and are undesirable for exterior paints. When preparing paints for interior uses in which water-sensitivity is not an important factor, they may be used. Other materials related to casein, like gelatin, suffer the same changes in chemical composition as does casein and are not satisfactory as viscosity stabilizers.

The temperature at which the emulsion is preferably treated is one at which relatively rapid loss of viscosity results without impairing the fundamental properties of the emulsion or the resulting paint. Heating to a range of about 60 to 70° C. is preferred since the desired decrease in viscosity then occurs in from 24 to 36 hours. The optimum temperature will depend upon the exact composition of the emulsion. If cellulose ethers are added before the change in viscosity is effected, the maximum temperature may be somewhat limited by the loss in solubility of some of these ethers at elevated temperatures. But, if the temperature is not raised too high, the cellulose ethers redissolve on cooling. On the other hand, since it is not necessary to add the viscosity stabilizing agent until after the step of decreasing the initial viscosity has been completed, the effect of heat on these ethers may be avoided. Instead of the emulsions being heated, they may be aged at room temperature until their viscosity reaches a constant value.

In the following examples further details of the process will make clear to those skilled in the art the practice of this invention, which is limited only by the scope of the appended claims.

Preparation A

Casein, 50 parts, is peptized in 200 parts of water, to which has been added approximately 12 parts of aqua ammonia and 6 parts of boric acid.

Preparation B

A suitable alkyd-type resin is prepared from 100 parts of phthalic anhydride, 63 parts of linseed oil fatty acids, 114 parts of soya bean fatty acids, and 63 parts of glycerine. The mixture is heated at 240° C. until the acid number is below 15. If desired, about 2% of a maleic acid-rosin-glycerine resin may be added. Drier is added to give 0.2% lead and 0.05% cobalt on the weight of the alkyd resin. When the mixture is cooled to a temperature of 80–90° C., it is ready for use.

Example 1

To 64.5 parts of preparation A there was added with stirring 150 parts of preparation B. Phenol to the extent of 0.9 part in 139 parts of water was then added. The emulsion was maintained at 60° C. for 24 hours, during which time the viscosity decreased. One and one-half parts of sodium alginate were then added and the viscosity, determined by the Gardner mobilometer, increased to about 100 seconds, a value which was unchanged three months later.

Another emulsion was prepared as above except for the addition of about 12 parts of triethanolamine oleate to preparation A. In both cases viscous, stable emulsions were obtained, which were useful as coatings and which could be pigmented to yield water-base paints.

Example 2

About 9 parts of triethanolamine oleate were combined with 64.5 parts of preparation A. Then, 150 parts of preparation B were stirred into the mixed emulsifying agents. 106 parts of a 4% aqueous solution of methyl cellulose was added. The emulsion was kept moderately warm for several days, after which time the viscosity had dropped and become constant. A sample kept at 60° C. to accelerate ageing showed an approximately constant viscosity for over 400 hours.

Example 3

The same modification of preparation A was used here as in Example 2 and 150 parts of preparation B added, followed by the addition of about 100 parts of a 4.2% solution of hydroxyethyl cellulose and ⅛ part of mercuric chloride in 6.5 parts of water. The hydroxyethyl cellulose used was a carefully purified and dialyzed preparation. The emulsion was heated at 50-60° C. until the viscosity became constant. It was then ready for use as a water-paint base.

*Example 4*

The hydroxyethyl cellulose of Example 3 was replaced with a crude product, 55 parts of a 7.75% solution being used. In adjusting the solids content it then became necessary to add 54 parts of water in place of the 6.5 parts used in Example 3. The emulsion was stabilized at 60-70° C. in about 24 hours and the viscosity was constant during storage.

The emulsions were easily pigmented with titanium dioxide, barium titanium pigment and lithopones. Inert pigments such as mica, clay, silica, and the like could be incorporated as well as tinting pigments and toners. The resulting paints were readily brushed or sprayed onto many types of surfaces. They were superior in ease of application, spreading, coverage, durability, lack of staining, and washability. They may be used for interior or exterior purposes and are particularly useful for painting porous materials, such as plaster, wall-board, stucco, brick, wood, and concrete.

While this invention is concerned primarily with the preparation of emulsions for use as a paint or paint vehicle, for which purpose drying oil-modified alkyd resins are primarily the resins which come into consideration, the principles involved are also applicable to emulsions of non-drying alkyds which may be used, for instance, in the preparation of textile finishing compositions.

We claim:

1. A method of preparing an emulsion which is characterized by its usefulness for water-base paints and its constant viscosity, which comprises mixing casein, peptized in ammoniacal solution, with a drying oil-modified alkyd resin so as to form an oil-in-water type emulsion, heating the emulsion below 100° C. until its viscosity has decreased to an approximately constant value and adding at any desired stage of the process a water-soluble alginate.

2. A process for preparing an emulsion which is characterized by its usefulness for water-base paints and its stable viscosity, which comprises peptizing casein in a buffered ammoniacal solution, adding to said casein dispersion, with agitation, a drying oil-modified alkyd resin so as to form an oil-in-water type emulsion, ageing the emulsion until its viscosity has decreased to an approximately constant value, and adding at any desired stage of the process a water-soluble alginate.

3. An oil-in-water type emulsion, suitable for a water-paint base and characterized by stable viscosity, which contains an aqueous casein solution the initial viscosity of which has been reduced to a substantially constant value, a drying oil-modified alkyd resin dispersed therein, and a water-soluble alginate.

4. The emulsion described in claim 3 in which the water-soluble alginate is sodium alginate.

5. A water-base paint comprising pigment dispersed in an emulsion having as the continuous phase an aqueous casein solution whose initial viscosity has been reduced to a substantially constant value, and as the dispersed phase a drying oil-modified alkyd resin, and containing as a thickening agent, a chemically stable organic compound from the group consisting of water-soluble alginates.

6. In the process of preparing an oil-in-water type emulsion of an oil-modified alkyd resin dispersed in an aqueous casein solution, suitable for a water-paint base and characterized by stable viscosity, the steps which include ageing the emulsion to decrease the viscosity to an approximately constant value and adding to the emulsion a water-soluble alginate.

7. In the process of preparing an oil-in-water type emulsion of an oil-modified alkyd resin dispersed in an aqueous casein solution, the steps which comprise heating the emulsion below 100° C. until its viscosity has decreased to an approximately constant value and adding a water-soluble alginate.

HAROLD C. CHEETHAM.
ROBERT J. MYERS.